United States Patent Office 3,242,107
Patented Mar. 22, 1966

3,242,107
POLYURETHANE PLASTICS PREPARED FROM A TERTIARY BUTYL PHENOL FORMALDEHYDE RESIN
Wilhelm Bunge, Otto Bayer, Erich Klauke, and Hans Hertlein, all of Leverkusen, Germany, assignors to Farbenfabriken Bayer Aktiengesellschaft, Leverkusen, Germany, a German corporation
No Drawing. Filed Oct. 12, 1960, Ser. No. 62,104
Claims priority, application Germany, Oct. 15, 1959, F 29,617
5 Claims. (Cl. 260—2.5)

This invention relates to polyurethane plastics and, more particularly, to improved polyurethane products based on phenol-aldehyde resins.

It is known that phenol-formaldehyde resins prepared under acid conditions can be modified with isocyanates. However, the resulting urethanes revert into the phenol and the isocyanate at temperatures above about 150° C. and, therefore, have very poor heat stability. Also, it is known to use the reaction products of phenol-formaldehyde resins and organic polyisocyanates as fillers which harden without shrinkage but which are again not resistant to high temperatures. Furthermore, when producing these fillers, it is necessary to heat the components or add catalysts to accelerate the reaction. The products are brittle materials.

It is, therefore, an object of this invention to provide improved polyurethane plastics based on phenol-aldehyde resins which are more stable to heat and which have improved flexibility. Another object of this invention is to provide improved resins based on phenol-aldehyde resins suitable for reaction with organic polyisocyanates to prepare said improved polyurethane plastics. Another object of this invention is to provide polyurethane plastics based on phenol-formaldehyde resins which have improved color stability, light stability and heat stability. A further object of this invention is to provide cellular polyurethane plastics from these resins.

The foregoing objects and others which will become apparent from the following description are accomplished in accordance with the invention, generally speaking, by providing polyurethane plastics based on phenol-aldehyde resins obtained from the reaction product of a phenol-aldehyde resin, preferably a tertiary butyl phenol-formaldehyde resin, and an adduct thereof with an alkylene oxide. Thus, this invention contemplates polyurethane plastics obtained from particular phenol-formaldehyde resins which are more particularly condensation products of an alkylene oxide with a tertiary butyl phenol-formaldehyde resin. The products have improved temperature and color stability.

Any suitable phenol-aldehyde resin may be used but it is preferred to use those resins which are obtained by reacting tertiary butyl and preferably p-tertiary butyl phenol with formaldehyde under acid conditions. The resulting phenol-aldehyde resin is then reacted with an alkylene oxide by condensation of the phenolic hydroxyl groups present with the alkylene oxide to yield a product having predominately alcoholic hydroxyl groups. The adducts of phenol-aldehyde resins and alkylene oxides are hereinafter frequently referred to as modified phenolic resins. The subsequent reaction of the adduct of the alkylene oxide and a phenol-aldehyde resin with an organic polyisocyanate yields alkyl urethane groups which are far more temperature resistant than the urethane groups obtained from phenolic hydroxyl groups. Furthermore, the use of the tertiary butyl phenol-formaldehyde resins results in a reduction in the softening point which is very desirable for further processing. Also, the solubility in organic solvents is often improved thereby making the production of polyurethane plastics much easier. For example, whereas the tertiary butyl phenol-formaldehyde resins which have not been reacted with an alkylene oxide are practically insoluble in hydrocarbons and particularly benzine and their solutions in benzene can only be blended with small quantities of benzine hydrocarbons, complete solubility in benzine can be obtained when the adducts of the tertiary butyl phenol-formaldehyde resins are employed. This is particularly true where the homologues of ethylene oxide are used for modification of the tertiary butyl phenol-formaldehyde resins.

Any suitable alkylene oxide may be used such as, for example, ethylene oxide, propylene oxide, butylene oxide, amylene oxide, epichlorohydrin, styrene oxide and the like. The homologues of ethylene oxide are preferred.

The preferred phenol-formaldehyde resins of this invention are those which are obtained from p-tertiary butyl phenol and formaldehyde under acid conditions. These products are superior not only with regard to heat stability, but further they are more light fast and exhibit better solubility than the other phenol-formaldehyde alkylene oxide condensates. The tertiary butyl phenol-formaldehyde resins can be reacted with alkylene oxides in accordance with the prior art to produce adducts which have varying degrees of viscosity and varying content of alcoholic groups depending on the quantity of alkylene oxide which is used. The preferred starting materials for further reaction with organic polyisocyanates are those which contain from about 2 percent to about 8 percent by weight of hydroxyl groups and have a molecular weight of about 400 to 4000. Suitable alkylene oxides as set forth above may be used either alone or in admixture with one another or they may be reacted with the resins successively to form the resins suitable for further modification with an organic polyisocyanate. It is preferred that the tertiary butyl phenol-formaldehyde resins have at least three phenolic groups. The molecular weight of the resin is preferably between 300 and 1200. While the tertiary butyl phenol-formaldehyde resins are preferred, the invention contemplates phenol-aldehyde resins generally which may be prepared from any suitable phenol by condensation under acid conditions with any suitable aldehyde. Suitable phenols are, for example, phenol, 2-methyl phenol, p-methyl phenol, p-chloro phenol, p-nitro-phenol, p-phenyl phenol and the like. Suitable acids are, for example, oxalic acid, sulphuric acid and the like. Suitable aldehydes in addition to formaldehyde are, for example, acetaldehyde, propionaldehyde and the like.

The reaction between the modified phenolic resin and the organic polyisocyanate proceeds readily upon the mere combination of the two components and in its broad aspect the process of the invention contemplates this combination.

Any suitable organic polyisocyanate may be used including those compounds which form adducts with isocyanates such as phenol and the like, which split off at elevated temperatures to yield isocyanates. Suitable compounds are, for example, tetramethylene diisocyanate, hexamethylene diisocyanate, thiodipropyl diisocyanate, ω,ω'-diisocyanatodialkyl benzenes or naphthalenes, such as dibenzyl diisocyanate and the like, cyclohexane, diisocyanates, aryl diisocyanates, such as p-phenylene diisocyanate, 1,5-naphthalene diisocyanate and the like, and polyisocyanates of the alkyl- and aryl-substitution products of benzene and naphthalene, such as 2,4- and 2,6-toluylene diisocyanate, p,p',p''-triphenylmethane triisocyanate and the like, as well as their partial hydrogenation products, 3-(α-isocyanatoethyl)-phenyl isocyanate, diphenyl ether polyisocyanates, diphenyl sulphone polyisocyanates. There are also to be considered reaction products containing free isocyanato groups and obtained from the above-mentioned diisocyanates and polyisocyanates with compounds containing reactive hydrogen atoms, for example, with alcohols, phenols, amines, polyesters, polyethers, polythioethers and polyacetals. Furthermore, suitable polyisocyanates or substances splitting off polyisocyanates are the products which can be prepared according to German patent specifications 1,035,362 and 1,013,869 by partial polymerization of diisocyanates or polyisocyanates or by polymerization of partially alkylated or arylated polyisocyanates. The compounds containing biuret groups and obtainable from polyisocyanates and water are also to be mentioned.

The amount of the modified tertiary butyl phenol-formaldehyde resin to be reacted with an organic polyisocyanate is preferably adjusted so that an —NCO to —OH ratio of about 0.8:2.5 is obtained which will yield cross-linked plastics of high molecular weight which are insoluble in most organic solvents. According to one embodiment an NCO to OH ratio of about 1:1 is employed. The addition of the polyisocyanate can either be in one stage or by separate stages so that the final cross-linking proceeds by way of intermediate stages of relatively high molecular weight. Another embodiment of the invention involves choosing such a large quantity of isocyanate that about two isocyanate groups occur for each hydroxyl group. The usually soluble products which contain free isocyanato groups can then be further reacted with cross-linking agents to produce polyurethane plastics.

The modified pehnolic resins are compatible with other active hydrogen containing materials. Where mixtures of the modified phenolic resins with other organic compounds containing at least two active hydrogen containing groups as determined by the Zerewitinoff method are used, any suitable compound of this type may be employed. Suitable organic compounds containing active hydrogen containing groups are for example, hydroxyl polyesters, polyhydric polyalkylene ethers, polyhydric polythioethers, polyhydric alcohols and the like. These compounds preferably have a molecular weight between about 500 and about 10,000, most preferably between about 1,000 and about 5,000, hydroxyl numbers of about 25 to about 600 and acid numbers, where applicable, below about 5. Any suitable hydroxyl polyester may be used such as are obtained, for example from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid, α-β-diethylsuccinic acid, isophthalic acid, terephthalic acid, hemilellitic acid, trimellitic acid, trmesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used either as a separate component or for preparation of the polyester, such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrin such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxylic polyester with only a portion of the components being a diamine such as ethylene diamine and the like.

It is possible in accordance with the invention to produce cellular or nonporous polyurethane plastics including thin films, coatings, adhesive layers, impregnated compositions, castings, moldings and the like.

Cellular polyurethane plastics which have good resistance to elevated temperatures may be prepared by including a blowing agent in the reaction mixture. Water will act as a blowing agent by reaction with the isocyanate to produce carbon dioxide. Other suitable blowing agents include for example, the halohydrocarbons such as dichlorodifluoromethane, trichlorofluoromethane and the like. It is preferred in the preparation of cellular polyurethane plastics in accordance with the present invention to react an excess of an organic polyisocyanate with the modified phenolic resins in a first step to prepare an isocyanate modified prepolymer having terminal —NCO groups and then react said isocyanate modified prepolymer in a second step with water to produce a cellular polyurethane plastic. It is also possible to combine the organic polyisocyanate, water and the modified phenolic resins in a single working step to produce a cellular polyurethane plastic.

Suitable processes, catalysts, emulsifiers and the like are disclosed in U.S. Reissue Patent 24,514. Moreover, the mixtures when they are reacted with organic polyisocyanates and water, retain a low viscosity for a longer period of time than the pure modified phenolic reaction products and, therefore, will fill the small crevices in an intricate cavity.

Other additives may be included in the reaction mixture for the preparation of cellular polyurethane plastics such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,-748. Where polyhydric polyalkylene ethers are included in the reaction mixture to prepare a cellular polyurethane plastic, it is preferred to employ the silicone oil of the above patent which has the formula

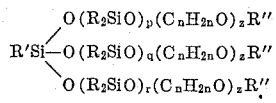

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

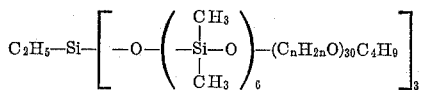

wherein $(C_nH_{2n}O)$ is a mixed polyoxyethylene and oxypropylene block copolymer containing about 17 oxyethylene units and about 13 oxypropylene units.

The use of the modified phenolic resins of the invention is particularly advantageous for the preparation of rigid or semi-rigid cellular polyurethane plastics where a nonreactive blowing agent such as the halohydrocarbons are used. Rigid cellular polyurethane plastics prepared from aliphatic polyhydroxyl compounds in the presence of a halohydrocarbon do not have urea groups to strengthen the cellular structure. The use of halohydrocarbons instead of water to produce a cellular framework is advantageous because it reduces the cost of the system by requiring less organic polyisocyanate. In accordance with this invention a rigid cellular framework can be produced from a mixture of the modified phenolic remain and the halohydrocarbon reacted with an organic polyisocyanate which approaches the strength and stiffness of those systems reacted with water to produce urea groups. Generally speaking, from about 1 to about 75 parts of a halohydrocarbon are used per hundred parts of the modified phenolic resin or mixture thereof with a polyhydroxy compound such as a polyhydric polyalkylene ether. The mixture is then combined with from about 5 to about 100 parts of an organic polyisocyanate to prepare a cellular polyurethane plastic. Of course, the amount of organic polyisocyanate depends on the reactive groups in the modified phenolic resin.

The modified phenolic resins of the invention can also be reacted with organic polyisocyanates to prepare coatings which have improved physical properties. The coatings of the invention may be prepared by combining the modified phenolic resin with an organic polyisocyanate in an inert organic solvent therefor and applying the resulting coating composition to a substrate and allowing it to cure.

A storage stable coating composition may be prepared by mixing the reaction product of an organic polyisocyanate with a monohydric alcohol or monohydric phenol to block the —NCO group and then combining this reaction product with the modified phenol-aldehyde resin or mixtures thereof with other organic compounds containing at least two active hydrogen containing groups. This coating composition preferably in an inert organic solvent therefor is then applied to a substrate and heated to cause curing thereof by regeneration of the alcohol yielding —NCO groups for reaction with the phenolic resins. Suitable monohydric alcohols or phenols for blocking the isocyanate include for example, methanol, ethanol, propanol, butanol, pentanol and the various positional isomers thereof, such as, for example, 2-methylbutanol, hexanol and the like. Higher alcohols may be used such as, for example, dodecanol and the like but it is preferred to employ alcohols having from one to six carbon atoms and most preferred are those which have from four to six carbon atoms since these are easier to dissolve in the reaction components after reaction with the organic polyisocyanate. Suitable phenols for blocking the polyisocyanate include phenol, 2-methyl phenol, 2,3-dimethyl phenol, 2,4-dimethyl phenol, and the like.

In the preparation of the coating compositions it is often advantageous where the blocked organic polyisocyanates are used to include a catalyst which will lower the temperature at which the urethane group will react with the active hydrogen atom of the phenolic resins. A particularly advantageous group of catalysts are the tin compounds and especially those which contain at least one carbon to tin bond such as, for example, dibutyl tin di-2-ethyl hexoate and the like. When the tin catalysts are included in the reaction mixture the coating composition may be cured by heating it to a temperature above about 300° F. and preferably within the range of from about 300° F. to about 450° F.

The coating compositions may be applied by any suitable method such as, for example, brushing, dipping, spraying and the like. Moreover, the coating compositions may contain pigments such as titanium oxide and the like and are preferably applied in an inert organic solvent such as, for example, ethylene glycol monoethyl ether acetate, xylene and the like.

In accordance with the process of the invention substantially nonporous polyurethane plastics may be prepared which are hard and solvent resistant. Thus, it is possible to prepare hard polyurethane castings by reacting an organic polyisocyanate with the modified phenolic resins under substantially anhydrous conditions. It is preferred to prepare the hard castings of the invention by reacting an excess of an organic polyisocyanate with the modified phenolic resins in a first step to prepare a prepolymer having terminal —NCO groups and then reacting said prepolymer in a second step with a chain-lengthening agent under substantially anhydrous conditions to produce a solid, substantially nonporous polyurethane plastic. This process is especially adapted to the production of castings and yields elastomers which have good impact resistance and hardness. Suitable chain-extending agents include for example, polyhydric alcohols, amino alcohols and polyamines. Any suitable polyhydric alcohols may be used as the chain-extending agent such as, for example, ethylene glycol, propylene glycol, butylene glycol, amylene glycol, bis($\beta$-hydroxy ethyl)diphenyl dimethyl methane and the like. Any suitable amino alcohol may be used such as, for example, ethanol amine, propanol amine, butanol amine and the like. Any suitable polyamine may be used such as, for example, ethylene diamine, propylene diamine, butylene diamine, amylene diamine and the like. Of course, primary amines are preferred. It is also preferred to employ monomeric chain-extending agents although short chain polymeric chain-extending agents such as, for example, diethylene glycol, triethylene glycol and the like can also be employed.

The polyurethane plastics of the invention have many uses. The cellular polyurethane plastics are particularly useful for the preparation of both thermal and sound insulation, for example. The coating compositions are advantageously employed for the coating of various substrates including wood, metal, such as steel, paper and the like. The coatings are particularly useful in the preparation of marine finishes since they have good salt water resistance. The substantially nonporous polyurethane plastics of the invention are useful in the preparation of castings and particularly hard castings such as are used, for example, in the manufacture of molded objects such as toys, caster wheels and the like.

The invention is further illustrated by the following examples in which the parts are by weight unless otherwise indicated.

Example 1

(a) About 5500 parts of p-tertiary butyl phenol, about 2288 parts of formaldehyde, approximately a 40 percent aqueous solution, and about 762 parts of water are heated to about 95° C. to about 98° C. In the course of about 1 hour, a solution of about 22 parts of p-toluene sulphonic acid in about 60 parts of water is introduced and the reaction mixture is kept for about 8 hours under gentle reflux. The water is then removed, initially at approximately atmospheric pressure and then under partial vacuum. After melting out at about 170° C. in a partial vacuum of about 15 to about 20 mm. Hg whereby small quantities of unmodified p-tertiary butyl phenol pass over, there is left in the cold state a brittle p-tertiary butyl phenol-formaldehyde resin which is soluble in alcohol, acetone, acetic ester, methyl glycol acetate, benzene and toluene.

The viscosity of the concentrated solution in organic solvents fluctuates according to the period of condensation. With approximately a 60 percent solution in methyl glycol ether acetate, it is substantially between about 250 and about 2000 cp./25° C.

(b) About 100 parts of a propoxylated p-tertiary butyl phenol-formaldehyde resin prepared in Example 1(a) with about 5.6 percent hydroxyl and an acid number of substantially 0 and containing about 50 percent of propylene oxide are dissolved in about 250 parts of a solvent mixture consisting of equal parts of ethyl acetate, butyl acetate, toluene and methyl glycol acetate. About 19 parts of approximately a 10 percent acetyl cellulose solution (same solvent mixture), about 188 parts of titanium dioxide and about 117 parts of approximately a 75 percent acetic ester solution of a polyisocyanate obtained by reaction of 3 mols of 2,4-toluylene diisocyanate with 1 mol of trimethylol propane are added.

This pigmented lacquer solution, after being applied to supports of various types and after a brief drying period at room temperature, yields lacquer coatings which adhere very satisfactorily, have good luster, and while having good elasticity, show a high hardness number (pencil hardness 6H) and also excellent resistance to alkalies.

Example 2

About 274 grams of the reaction product of equal parts of p-tertiary butyl phenol-formaldehyde resin prepared in Example 1(a) and ethylene oxide (about 5.8 percent —OH, acid number about 0.6) are degassed for a short time at about 50° C. under partial vacuum and then about 87 grams of 2,4-toluylene diisocyanate are added thereto. After brief mixing, the clear melt is poured into molds, in which it is finally hardened at room temperature within a few hours to give a clearly transparent, insoluble, tough but elastic plastic.

Example 3

About 300 parts of a product obtained by reacting equal parts of p-tertiary butyl phenol-formaldehyde resin prepared in Example 1(a) and propylene oxide, the product having about 5.7 percent —OH with an acid number of substantially 0 and a viscosity of about 907 cp./75° C., are treated at about 50° C. while stirring under partial vacuum until the thinly liquid melt flows without bubbles. About 87 parts of a technical toluylene diisocyanate consisting of about 65 parts of 1-methylbenzene-2,4-diisocyanate and about 35 parts of 1-methylbenzene-2,6-diisocyanate are added, the mixture is stirred until homogeneous, a vacuum is again applied for a short time and the clear thinly liquid melt is poured into molds, in which the curing is effected in about four hours by heating to about 110° C.

Clear, transparent and bubble-free castings are obtained which show scarcely any tendency to shrinkage and can be machined with cutting tools. The melt is also excellently suitable for filling joints.

Example 4

About 370 parts of a propoxylated p-tertiary butyl phenol-formaldehyde resin prepared in Example 1(a) with about 4.6 percent —OH, acid number substantially 0, viscosity about 310 cp./75° C., are treated for about 30 minutes at about 50° C. under partial vacuum. A mixture of about 50 parts of the toluylene diisocyanate mixture employed in Example 3 and about 100 parts of the reaction product of 3 mols of 2,4-toluylene diisocyanate and 1 mol of trimethylol propane is now introduced at atmospheric pressure while stirring and again treated for a short time under a partial vacuum. After being poured into a metal mold and heated for about 30 minutes to about 180–190° C., a crystal clear molded element is formed with a good hardness factor and elasticity.

Example 5

About 100 parts of a soft resin obtained by reacting about 52 parts of the previously described p-tertiary butyl phenol-formaldehyde resin prepared in Example 1(a) with about 48 parts of propylene oxide in the presence of some sodium hydroxide, the said resin having a viscosity of about 12500 cp./50° C., an —OH content of about 6.2 percent and an acid number of about 0.4, are intimately mixed at the same time on a machine mixer as described in U.S. Reissue Patent 24,514 with about 1 part of sodium phenolate, about 4 parts of approximately a 50 percent aqueous solution of the sodium salt of a castor oil sulphonic acid, about 0.3 part of a water-soluble polysiloxane polyalkylene oxide copolymer having the formula

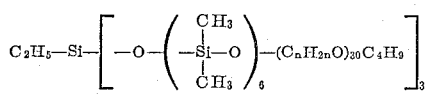

wherein $(C_nH_{2n}O)$ is a mixed polyoxyethylene and oxypropylene block copolymer containing about 17 oxyethylene units and about 13 oxypropylene units and about 69 parts of the technical toluylene diisocyanate mixture employed in Example 3.

A hard foam material is obtained which quickly sets and has the following physical properties:

| | |
|---|---|
| Weight per unit volume _____kg./m.$^3$__ | 36 |
| Compressive strength _____kg./cm.$^2$__ | 1.7 |
| Notch toughness _____kg./cm__ | 0.15 |
| Water absorption _____percent__ | 0.7 |
| Hot-bending strength at 10 g. load_____° C__ | 132 |

Example 6

About 100 parts of a propoxylated p-tertiary butyl phenol-formaldehyde resin, obtained by reacting about 41 parts of the p-tertiary butyl phenol-formaldehyde resin prepared in Example 1(a) with about 59 parts of propylene oxide, and having about 6.0 percent of hydroxyl, an acid number of substantially 0 and a viscosity of about 33200 cp./50° C., are thoroughly mixed mechanically with about 3 parts of dimethyl benzylamine, about 5 parts of approximately a 50 percent castor oil sulphonate solution in water, about 0.3 part of the water-soluble polysiloxane polyalkylene oxide copolymer employed in Example 5 and about 103 parts of 4,4'-diphenylmethane diisocyanate (90%).

A practically nonshrinking foam material is formed which has the following physical properties:

| | |
|---|---|
| Weight per unit volume _____kg./m.$^3$__ | 47 |
| Compressive strength _____kg./cm.$^2$__ | 3.6 |
| Notch toughness _____kg./cm__ | 0.4 |
| Water absorption _____percent__ | 2 |
| Hot-bending strength at 10 g. load _____° C__ | 130 |

Example 7

About 50 parts of a soft resin with about 3.3 percent hydroxyl, an acid number of about 1.1 and a viscosity of about 195 cp./50° C., obtained by condensation of about 10.8 parts of the previously described p-tertiary butyl phenol-formaldehyde resin prepared in Example 1(a) with about 39.2 parts of propylene oxide in a pressure vessel, about 50 parts of a polyester (about 10.9 percent hydroxyl) obtained from 1 mol of adipic acid, 2 mols of phthalic acid anhydride, 1 mol of oleic acid and 5 mols of trimethylol propane, about 2 parts of dimethyl benzylamine, about 5 parts of approximately a 50 percent aqueous solution of a castor oil sulphonate and about 89 parts of an initially polymerized toluylene diisocyanate mixture (isomer ratio about 65:35) containing about 12 percent of trimer and about 42 percent of isocyanate are intimately mixed, the low viscosity of the propoxylation product making very easy mixing possible.

The fine-pored, nonbrittle hard foam material showing no shrinkage tendency has the following physical properties:

Weight per unit volume _____kg./m.$^3$__ 37
Compressive strength _____kg./cm.$^2$__ 1.2
Notch toughness _____kg./cm__ 0.4
Water absorption _____percent__ 1
Hot-bending strength at 10 g. load _____° C__ 120

*Example 8*

About 50 parts of a soft resin (about 4.4 percent hydroxyl, acid number about 1.2, viscosity about 529 cp./50° C.), prepared by reacting about 17.8 parts of p-tertiary butyl phenol-formaldehyde resin prepared in Example 1(a) with about 32.2 parts of propylene oxide and about 50 parts of a polypropylene glycol with about 10.6 percent hydroxyl and branched with trimethylol propane are mechanically mixed with about 1 part of permethylated β-aminoethyl piperazine, about 5 parts of approximately a 50 percent aqueous solution of a castor oil sulphonate, about 0.3 part of the water-soluble polysiloxane polyalkylene oxide copolymer employed in Example 5 and about 100 parts of initially polymerized toluylene diisocyanate (isomer ratio about 65:35) with about 42 percent isocyanate.

The quickly hardening foam material has the following properties:

Weight per unit volume _____kg./m.$^3$__ 36
Compressive strength _____kg./cm.$^2$__ 1.7
Notch toughness _____kg./cm__ 0.2
Water absorption _____percent__ 2
Hot-bending strength at 10 g. load _____° C__ 105

*Example 9*

To the mixture of about 50 parts of propoxylated p-tertiary butyl phenol-formaldehyde resin prepared in Example 1(a) containing about 35.6 percent propylene oxide (about 4.5 percent hydroxyl, viscosity about 743 cp./50° C.) and about 50 parts of a polyester containing hydroxyl groups (about 8.9 percent hydroxyl) prepared by vacuum esterification of 2.5 mols of adipic acid, 0.5 mol of phthalic acid and 4 mols of a technical hexanetriol mixture, there are added mechanically and simultaneously about 2 parts of dimethyl benzylamine, about 5 parts of approximately a 50 percent aqueous solution of a castor oil sulphonate, about 10 parts of trichlorofluoromethane and about 88 parts of an initially polymerized toluylene diisocyanate mixture with about 42 percent isocyanate (original isomer ratio about 65:35) and mixed homogeneously.

A fine-pored, nonbrittle foam material is formed, which shows good adhesion to surface layers of many different types, and which has the following physical properties:

Weight per unit volume _____kg./m.$^3$__ 28
Compressive strength _____kg./cm.$^2$__ 0.9
Notch toughness _____kg./cm__ 0.4
Water absorption _____percent__ 1.3
Hot-bending strength at 10 g. load _____° C__ 103

It is to be understood that the foregoing examples are only illustrative and that any other suitable phenolic resin, alkylene oxide, organic polyisocyanate, catalyst or the like could have been used therein in accordance with the preceding disclosure.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyurethane plastic prepared by a process which comprises reacting an organic polyisocyanate with a polyol prepared by a process which comprises reacting an alkylene oxide with a para-tertiary butyl phenol-formaldehyde resin, said tertiary butyl phenol formaldehyde resin having been prepared under acid conditions, having at least 3 free phenolic hydroxyl groups, said polyol containing from about 2 percent to about 8 percent by weight of free hydroxyl groups and having a molecular weight of from about 400 to about 4,000 the amount of said polyol being so adjusted that an —NCO to —OH ratio of about 0.8:2.5 is present.

2. The polyurethane plastic of claim 1 wherein a blowing agent is included in the reaction mixture to prepare a cellular polyurethane plastic.

3. A polyurethane plastic prepared by a process which comprises reacting an organic polyisocyanate in an amount sufficient to correspond to an —NCO to —OH ratio within the range of from about 0.8:2.5 with a polyol prepared by a process which comprises reacting an alkylene oxide with a tertiary butyl phenol formaldehyde resin, said tertiary butyl phenol formaldehyde resin having been prepared under acid conditions and having at least three phenolic hydroxyl groups, said polyol containing from about 2% to about 8% by weight of free hydroxyl groups and having a molecular weight of from about 400 to about 4,000.

4. The polyurethane plastic of claim 3 wherein a blowing agent is included in the reaction mixture to prepare a cellular polyurethane plastic.

5. The polyurethane plastic of claim 3 wherein a blowing agent is included in the reaction mixture to prepare a cellular polyurethane plastic and said alkylene oxide is propylene oxide.

References Cited by the Examiner

UNITED STATES PATENTS

| | | | |
|---|---|---|---|
| 2,060,410 | 11/1936 | Balle | 260—51 |
| 2,906,717 | 9/1959 | Sekmakas | 260—2.5 |
| 2,894,931 | 7/1959 | Somerville et al. | 260—59 |
| 2,915,496 | 12/1959 | Swart et al. | 260—2.5 X |
| 2,968,641 | 1/1961 | Roberts et al. | 260—45.95 X |
| 3,032,517 | 5/1962 | Dombrow et al. | 260—2.5 |
| 3,054,756 | 9/1962 | Holtschmidt et al. | 260—2.5 |
| 3,075,927 | 1/1963 | Lanham | 260—2.5 |
| 3,119,783 | 1/1964 | Baum | 260—45.95 X |

FOREIGN PATENTS 1,183,538   1/1959   France.

LEON J. BERCOVITZ, *Primary Examiner.*

D. ARNOLD, *Examiner.*